(12) United States Patent
Malkin

(10) Patent No.: US 6,279,751 B1
(45) Date of Patent: *Aug. 28, 2001

(54) FILTRATION DEVICE

(76) Inventor: Edward Malkin, 52 Kennedy Ave., Rockville Centre, NY (US) 11570

(*) Notice: Subject to any disclaimer, the term of this patent is extended or adjusted under 35 U.S.C. 154(b) by 0 days.

This patent is subject to a terminal disclaimer.

(21) Appl. No.: 09/612,910

(22) Filed: Jul. 10, 2000

Related U.S. Application Data

(63) Continuation of application No. 09/053,394, filed on Apr. 1, 1998, now Pat. No. 6,105,787.

(51) Int. Cl.[7] ................................................ B01D 29/17
(52) U.S. Cl. .................... 210/457; 210/488; 210/497.01; 210/499
(58) Field of Search .................................. 210/457, 488, 210/497.01, 498, 499

(56) References Cited

U.S. PATENT DOCUMENTS

| | | | |
|---|---|---|---|
| 1,116,234 | 11/1914 | Brown | 210/499 |
| 1,677,118 | 7/1928 | Ford | 210/457 |
| 1,693,741 | 12/1928 | Wuest | 210/499 |
| 2,035,758 | 3/1936 | Pierce | 210/457 |
| 2,979,209 | 4/1961 | Nolden | 210/435 |
| 3,319,796 | 5/1967 | Royer et al. | 210/457 |
| 3,400,821 | 9/1968 | Singleton | 210/136 |
| 3,501,013 | 3/1970 | Madsen | 210/497 |
| 3,701,433 | 10/1972 | Krakauer et al. | 210/436 |
| 3,750,889 | 8/1973 | Acosta | 210/497 |
| 4,098,695 | 7/1978 | Novotny | 210/85 |
| 5,162,106 | 11/1992 | Kunda et al. | 423/511 |
| 5,587,071 | 12/1996 | Belden | 210/232 |

FOREIGN PATENT DOCUMENTS

| | | |
|---|---|---|
| 55-111513 | 8/1980 | (JP) . |
| 59-27806 | 2/1984 | (JP) . |
| 2-119909 | 5/1990 | (JP) . |
| 3-19511 | 2/1991 | (JP) . |
| 3-270702 | 12/1991 | (JP) . |
| 4-14107 | 2/1992 | (JP) . |
| 6-41809 | 6/1994 | (JP) . |
| 7-136413 | 5/1995 | (JP) . |
| 3032594 | 12/1996 | (JP) . |

OTHER PUBLICATIONS

Two photographs of a prior filter device.

*Primary Examiner*—Christopher Upton
(74) *Attorney, Agent, or Firm*—Burns Doane Swecker & Mathis L.L.P.

(57) ABSTRACT

A filtration device for removing particulate matter from liquids has a rigid tubular body that terminates in a pair of open ends. The body has a plurality of openings therein, leading to a bore, and a layer of a filtration material, such as a polypropylene mesh, is stretched over the surface of the body. The filtration material has a preferred pore size of between 30 and 60 microns. The body is manufactured from plastic, and has a support means which prevents collapse of the filtration device under pressure. The filtration material is attached near the ends of the body, and a pair of end caps are attached to the ends. The end caps serve as means of fitting the filtration device within equipment such as automated photographic processing apparatus. The materials used to manufacture the filtration device are chosen so as to be resistant to both the physical conditions (such as temperature, pressure and flow rate) and the chemical conditions of the apparatus. An advantage of having the filter material on the outside is that liquid flows from outside the filter, through the body and the inside, trapping particulate matter on the outside surface of the filter. The filter can be removed from the equipment where it is used, and particulate matter trapped on its surface washed off, and the filter can be reused, resulting in a substantial cost savings compared to the use of disposable filters.

15 Claims, 3 Drawing Sheets

FILTRATION DEVICE

CROSS-REFERENCE TO RELATED APPLICATION

This application is a continuation of application Ser. No. 09/053,394, filed Apr. 1, 1998, now U.S. Pat. No. 6,105,787.

STATEMENT REGARDING FEDERALLY SPONSORED RESEARCH OR DEVELOPMENT

Not Applicable.

REFERENCE TO A "MICROFICHE APPENDIX"

Not Applicable.

FIELD OF THE INVENTION

The present invention relates to filters for liquids. In particular, the present invention is a filtration device for removing particulate matter, debris and other items found as contaminants in solutions used in photographic processing equipment.

BACKGROUND OF THE INVENTION

In recent years, businesses offering rapid processing and printing of color print film, the "One Hour Photo" services, have proliferated. The commercial availability of the automated machines used for this rapid processing and printing, and their comparatively low cost have enabled many small business owners to enter the field, so that the photofinishing business is no longer confined to a few major commercial photo laboratories.

The processing equipment uses a variety of chemicals for film processing and printing. Each chemical is kept in a separate tank or reservoir from which it is pumped into the processing area of the machine at an appropriate time. After the specified time period for the chemical to be in contact with the film or print being processed, the chemical is pumped back to its storage tank, for reuse. The manufacturers supply directions as to the working life of each agent, and directions as how to replenish the chemicals after a specified usage. In the course of processing and storage of the chemicals, various types of particulate matter, debris such as film fragments or paper fragments, aggregates of photographic chemicals, dirt, dust, or microorganisms such as algae or bacteria may contaminate the chemicals and their storage tanks. The presence of contaminants can damage film or prints being processed by scratching negatives or prints, causing losses that may require reprocessing or retouching, assuming such damage can be remedied. Contaminants may decrease the efficacy of the chemicals themselves, or clog up the processing equipment, resulting in lost time spent to clean the equipment.

Although disposable filters are available, their replacement cost over time can be significant. The cumulative disposal of filters also has an environmental impact.

Nondisposable filters utilized in this equipment are difficult to reuse because the filtration material is mounted on the inside of the filter. Consequently, these filters are difficult to clean thoroughly. Some of the materials used to manufacture these filters are subject to being washed off or damaged when subjected to cleaning, thus preventing their reuse.

One commercially available product employs a stainless steel filter tube that is fitted over a frame manufactured from an extruded plastic material. Although this filter fits on the frame like a sleeve, it is difficult to clean and maneuver into a good (i.e., fluid-tight) fit within the apparatus.

Thus there is a need for a filtration device having a filter that in made of a reusable filtration material that is reusable, that won't be washed off of its support matrix during cleaning, and that won't be damaged during cleaning. Further, the filtration device should be made of materials capable of withstanding the physical conditions, including pressures, temperatures and flow rates, and chemical conditions of the environment of photographic processing chemicals in automated processing machines.

BRIEF SUMMARY OF THE INVENTION

An object of the present invention is to provide a filtration device that comprises a filter made of a reusable material.

Another object of the present invention is to provide a filtration device that can be used repeatedly over a long time period, making it economical to use.

Still another object of the present invention is to provide a filtration device that can withstand the extremes of pH that are characteristic of photographic developing and processing chemicals.

Yet another object of the present invention is to provide a filtration device which can be easily removed from its housing, washed free of particulate matter and other debris accumulated on the filter surface, and then be reused.

Still another object of the present invention is to provide a filtration device comprising a filtration material that is not readily damaged when being washed.

Yet another object of the present invention is to provide a filtration device in which the flow of the fluid is from the outside of the filter through the filter body and out through the inside of the filter body.

Still another object of the present invention is to provide a filtration device that can be used in a variety of high speed photographic processing equipment.

Yet another object of the present invention is to provide a filtration device that can be used in a variety of low speed photographic processing equipment.

The present invention is a filtration device for removing particulate matter from liquids, the filtration device having a rigid tubular body that terminates in a pair of open ends. The body has a plurality of openings therein, and a layer of a filtration material, such as a polypropylene mesh, is stretched over the surface of the body. The body is manufactured from plastic, and has a support means which prevents collapse of the filtration device under pressure. The filtration material is glued in place near the ends of the body, and a pair of end caps are attached to the ends. The end caps serve as means of fitting the filtration device within equipment such as automated photographic processing apparatus. The materials used to manufacture the filtration device are chosen so as to be resistant to both the physical conditions (such as temperature, pressure and flow rate) and the chemical conditions of the apparatus (such as developing agents, fixers or bleach solutions). An advantage of having the filter material on the outside is that liquid flows from outside the filter, through the body and the inside, trapping particulate matter on the outside surface of the filter. The filter can be removed from the equipment where it is used, and particulate matter trapped on its surface washed off, and the filter can be reused, resulting in a substantial cost savings compared to the use of disposable filters.

DETAILED DESCRIPTION OF THE INVENTION

The terms "reagent", "fluid", "chemistry", "chemical" or "solution" are being used interchangeably when referring to the fluids being filtered by the filtration device of the present invention.

The present invention is a filtration device 10 that is designed for use in conjunction with various types of commercial equipment for photographic film and paper processing operations, such as, but not meant to be limited to, those typically used by "One Hour Photo" service businesses.

Figure 1:
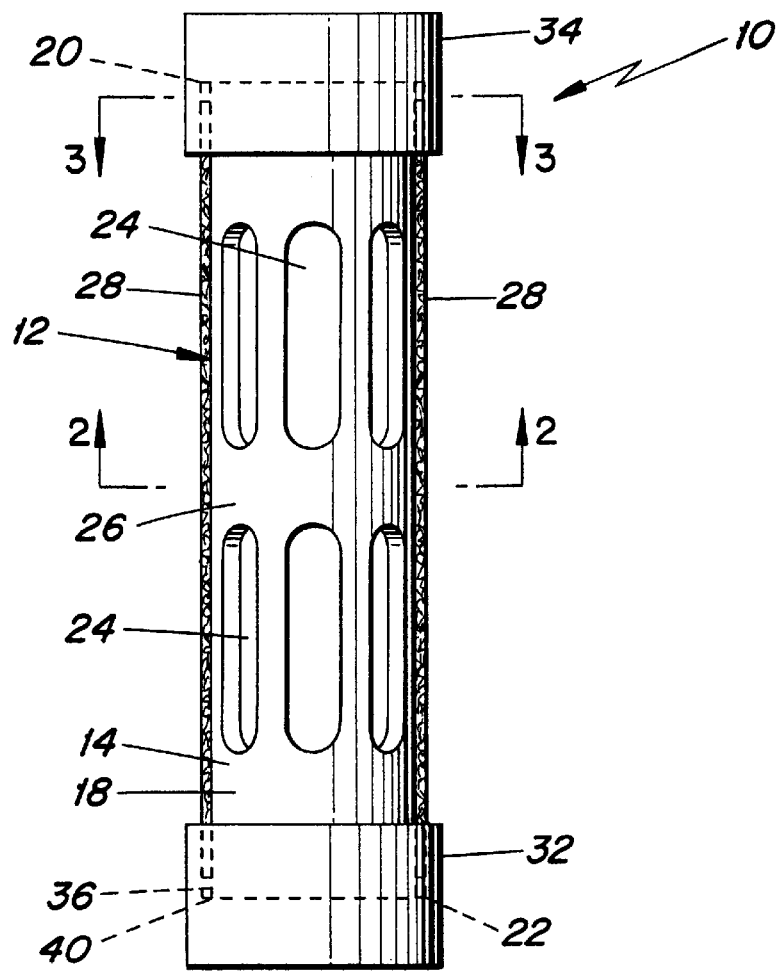
FIG. 1 is a side perspective view of the present invention.

The filtration device 10 has a hollow, rigid tubular body 12 (FIG. 1). The body 12 has a cylindrical wall 14 having an inside surface 16 and outside surface 18. The tubular body 12 is formed from a plastic such as polyvinylcarbonate ("PVC") by an extrusion process. This process also forms the plurality of openings 24 within the body wall. In the preferred embodiment, openings 24 are arranged in a symmetrical pattern, but this is due to the manufacturing process itself, and is not meant to be a limitation, as other configurations and orientations of openings can be utilized. A central bore 19 is coextensive with the inside length of body 12. Body wall 14 terminates at a pair of ends 20 and 22 (shown in phantom in FIG. 1). Reference numeral 26 refers to a central support structure. Support structure 26 is a critical element in that it prevents the collapse of the filtration device under the pressures commonly used to pump the chemicals used in these processing operations. Support structure 26 is a part of tube body 12, and does not extend past inside surface 16 (FIG. 2).

Figure 2:
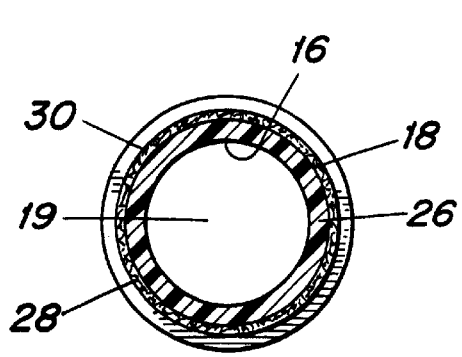
FIG. 2 is a sectional view through the middle of the filtration device taken along line 2—2 of FIG. 1.

A layer of filtration material 28 is stretched over the outside surface 18, covering the entire outside surface and extending to the ends 20 and 22 (FIGS. 1 and 2). Body 12 is open at both ends. In the preferred embodiment of the present invention, the filtration material 28 is a polypropylene mesh, which is held in place by means of PVC glue at the ends 20 and 22 of the body. The use of PVC glue is known to those skilled in the art. The mesh selected for the preferred embodiment has a pore size between approximately 30 microns and approximately 60 microns. Experiments have shown that a 30 micron pore size filter can remove algae contaminating photographic solutions. A seam 30 is coextensive with the length of the filtration material along a segment of body 12.

Figure 3:
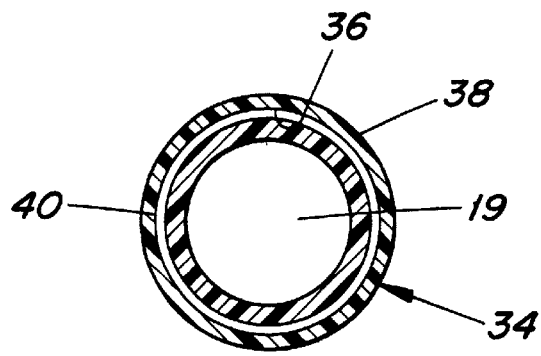
FIG. 3 is a top view of the present invention, taken along line 3—3 of FIG. 1.

Each end of tubular body 12 is attached to an end cap, 32 and 34, as shown in FIG. 1. The diameter of each end cap 32 and 34 is greater than the diameter of the body 12. As shown in FIGS. 1 and 3, the end caps in the preferred embodiment are identical, and the filtration device itself is symmetrical. Each end cap has inside surface 36 and outside surface 38. As shown in phantom in FIG. 1, inside surface 36 of each end cap overlaps the ends of tubular body 12 and part of the filtration material 28. This region of overlap forms a junction 40 (shown in FIG. 3). As shown in the Figures, the length of the filtration device body 12 is greater than the diameter of the body 12 and the diameter of end caps 32 and 34. The end caps are also manufactured from a suitable plastic. This ratio of body length to body diameter, in conjunction with the openings in the body, provides a large surface area for filtration.

Each end cap has an end 39 which fits into a receptacle on the filter housing of the apparatus.

The filtration device 10 is designed so that the flow of fluid is from the outside of the filtration device, through the filtration material 28, through openings 24, past inside surface 16 and out through one of the ends. (The direction of fluid flow is shown by arrows 200 in FIG. 5.) The other end is connected in such a way as to allow fluids to enter the filtration housing and surround the filtration device 10 as described further below.

Either end of filtration device 10 can be inserted into the filter pod (or housing) 120 (see below) because of the symmetry of the preferred embodiment of the present invention.

Depending upon the particular processing apparatus in which the present invention is employed, adapters may attached to the end caps 32 and 34 to facilitate insertion of the filtration device 10. The filtration device can be inserted into a receptacle at the bottom of the filter pod, held in place by rubber O-rings to effect a seal, or forced or pressed fit in position.

Filtration device 10 is capable of withstanding the pressure and flow rates of the various processing devices. The central support structure 26, which is shown in the illustrated embodiment of FIG. 1 as a central circumferential band, is disposed between a single upper circumferential row of openings 24 and a single lower circumferential row of openings. The central circumferential band 26 thus provides support to the body wall such that the openings may be made sufficiently large to expose the greatest desired area of the filtration material 28 to fluid flow. The present invention can be used in both high speed and low speed processing equipment. As an example, and not meant to be a limitation, a flow rate of five gallons per minute is typical of the flow rates that the filtration device 10 must withstand.

Figure 4:
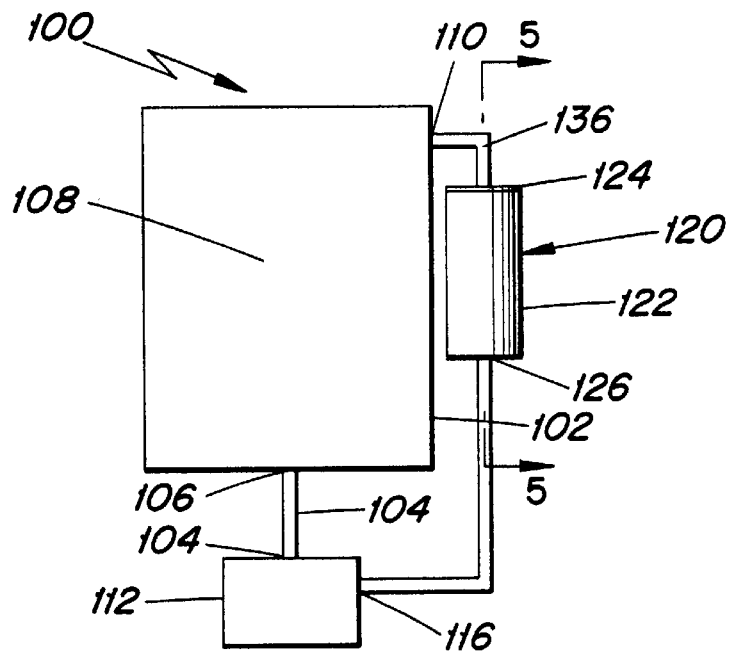
FIG. 4 is a schematic view showing how the present invention is used in a photographic processing apparatus.

Generally, a processing apparatus employs several chemicals, each of which is stored in their own tank or reservoir 100, as shown schematically in FIG. 4 (for a single tank). Thus, a single processing apparatus has multiple filters because a separate filtration device is used for each chemical, such as the developer, bleach, or fixer.

The present invention is retained in a filter pod 120 that is attached to the outside portion 102 of a tank 100 containing photographic chemicals 108. The filter pod or housing 120 can be molded onto the side of the tank as shown in FIG. 4, or it may be a separate unit that is attached to the tank outside by appropriate attachment means. Filter pod 120 has a body 122 and top portion 124 that is removably attached to body 122. Top portion 124 can be attached to body 122 by means known to those skilled in the art, such as, but not limited to, press fit, screwed on using threaded components, or retention by clamping means (not shown). It is important that pod body 122 and pod top 124 form a fluid-tight seal so as to prevent leakage of chemicals 108 during operation of the photofinishing apparatus.

Fluid conduit means 104 connect an outlet 106 of tank 100 to a pump 112 at inlet 114 and at pump outlet 116 fluid conduit means 118 connect pump 112 to the filter pod inlet 126. The fluid being processed is pumped into the filter pod inlet 126 and circulates outside of the filtration device 10 of the present invention.

Figure 5:
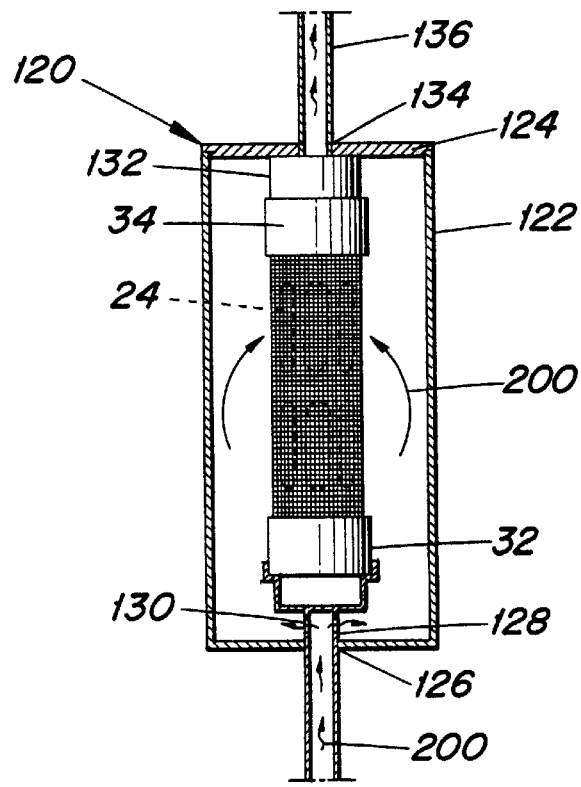
FIG. 5 is a sectional view taken along line 5—5 of FIG. 4 and showing the present invention in use in a photographic processing apparatus.

Fluid 108 surrounds filtration device 10 from the outside, passing first through filtration material 28, then through the plurality of openings 24 within filter body 12 (shown by arrows 200 in FIG. 5). Fluid 108 passes through inside surface 16 of filtration device 10, and the now filtered fluid passes through the end proximate the top portion 124 and reenters tank 100 by return conduit means 136 at tank inlet 110. Debris and particulate matter removed from the fluid is retained on the surface of the filtration material 28.

As shown in FIG. 5, filter end cap 34 fits a retaining means 128 in fluid communication with inlet 122 such that fluid 108 passes through openings 130 in retaining means 128 and surrounds filtration device 10. Junction 40 enables the filtration device 10 to form a fluid-tight seal with retaining means 120. Second end cap 34 is retained in a second retaining means 132 in a manner similar to first end cap 32. Second end cap 34 is in communication with housing top 124 and in fluid communication with housing outlet 134, through which the filtered fluid 108 passes, flows through return conduit means 136 and reenters tank 100 at inlet 110 for further use. The process is similar for each chemical in the processing operation, although individual flow rates may vary based on the specifications of the process itself.

Removing the top 124 when the processing device has been turned off serves multiple functions. It provides access to the filtration device 10, enabling one to inspect it for build up of particulate matter on its filter surface 28, examine the overall physical condition and whether there has been deterioration of any of its components or damage to the filter element, and to change filters when necessary.

Figure 6:
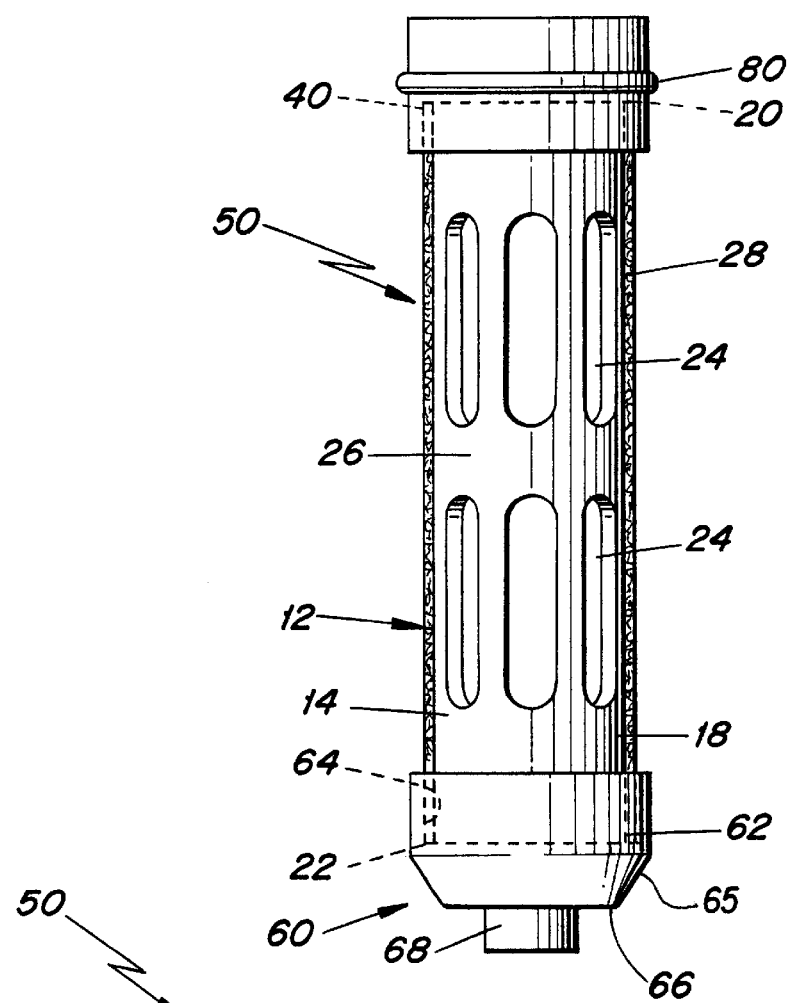
FIG. 6 is a side perspective view of an alternate embodiment of the present invention.
Figure 8:
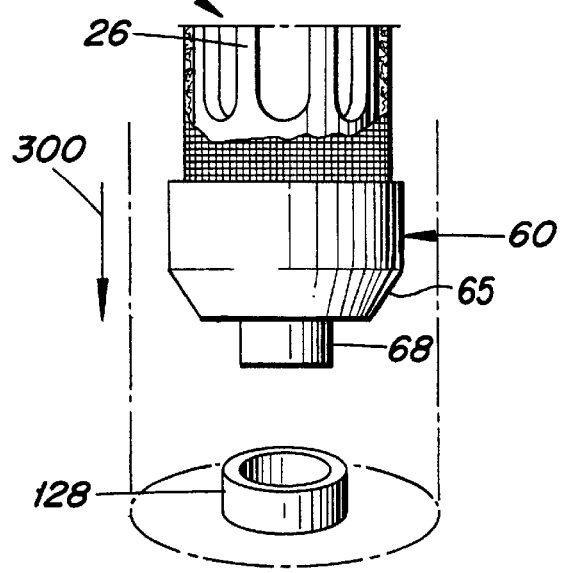
FIG. 8 illustrates the mounting of the present invention in the bottom of a filter housing.
Figure 7:
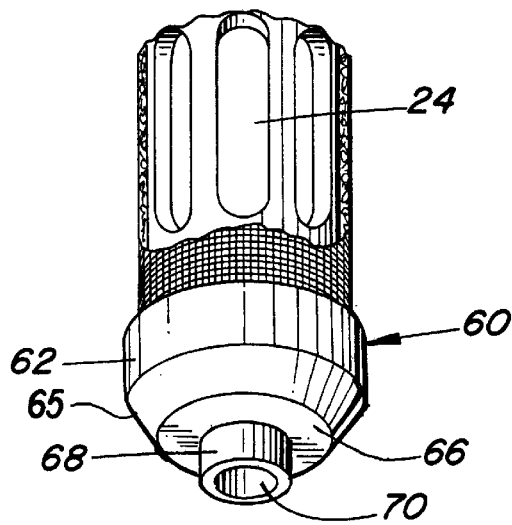
FIG. 7 is a bottom view of the embodiment shown in FIG. 6, illustrating the center nipple.

A second embodiment 50 of the present invention is shown in FIG. 6. Except as will be described below, the structural elements of the second embodiment are similar to the structural elements of the preferred embodiment shown in FIG. 1. In this embodiment first end cap 60 has a substantially vertical annular outside surface 62, inside surface 64, beveled annular surface 65, bottom 66 and a central nipple 68, the nipple having an opening therethrough (FIGS. 6 and 7), the opening passing through the bottom 66. As shown in phantom in FIG. 6, end 22 is attached to end cap 60. In this embodiment the end caps are glued to the body and the filtration material 28. The bottom end cap 60 is machined from a plastic, and the nipple 68 provides the filtration device a secure fit within the receptacle 120 in the filter housing (as shown in FIG. 8, the arrow 300 indicating the direction in which the filtration device 50 is urged to fit within the receptacle 120). An O-ring 80 is retained on the outside surface of the top end cap 20, and helps to provide a secure fit within the filter housing. The second embodiment 50 is designed to fit a processing machine of a manufacturer different from the one in which the preferred embodiment 10 of the present invention is used. The use, operation and cleaning of this embodiment is similar to those of the preferred embodiment.

The filtration material employed in the present invention is capable of withstanding the strong alkali and strong acid conditions that are characteristic of photographic chemicals. Developer solutions generally are alkaline, while the bleaches and fixatives are generally acidic solutions. In the preferred embodiment, this is a polypropylene mesh.

Because the filtration material is mounted on the outside of the filter body, any particulate matter or other items retained on the filtration material can be washed off, allowing the filtration device to be reused.

The mounting of the filtration material on the outside of the filtration device also provides easy inspection of the filtration material to verify its integrity and access whether there has been any damage to the filtration material while in use.

A significant increase in the pressure of the line, or a decrease in the flow rate, or both, are indicative of the filtration device becoming clogged, and a sign that the filtration device must be removed from the unit and cleaned.

As will be known to one skilled in the art, the orientation of the filtration device and its filter housing can be vertical, as shown in FIG. 5. The filtration device of the present invention will operate provided there is sufficient pressure in the system to circulate the chemicals through the filter.

The components used in the filtration device are manufactured from materials that preferentially are both physically resistant and chemically resistant to the chemicals used in the processing solutions.

The filtration devices can be changed periodically as part of a standard maintenance program, or when they show signs of wear.

While the above description has been directed specifically to using the filtration device to filter chemicals used in photographic processing equipment, the filtration device can be readily adapted for use in other areas where it is desired to remove particulate matter and other contaminants of certain sizes from liquids.

Therefore, although this invention has been described with a certain degree of particularity, it is to be understood that the present disclosure has been made only by way of illustration and that numerous changes in the details of construction and arrangement of parts may be resorted to without departing from the spirit and scope of the invention.

I claim:

1. A reusable filtration device for removing particulate matter from liquids in a liquids processing system, the reusable filtration device comprising:

a. a rigid, tubular body defining a longitudinal axis of the reusable filtration device, said body being defined by a body wall with an inside surface and an outside surface, and a bore within the body wall, the bore being coextensive with the body wall, wherein the body wall terminates in a pair of ends, the ends being open, wherein the body wall includes a central circumferential band and a plurality of openings, the openings being inlets for liquid to flow from outside of the filtration device and into the bore, said plurality of openings including only a first circumferential row of elongated longitudinal openings and a second circumferential row of elongated longitudinal openings, said first and second rows of openings being separated by the circumferential band;

b. a means for filtering surrounding the body wall outside surface, wherein the means for filtering is a layer of reusable filtration material; and c. an end cap mounted to the body at each body end, each end cap securing the filtration material to the body and each end cap being a means for positioning the filtration device within the liquids processing system, in which the liquid flows through the filtration material, enters through the body wall openings from the body outside surface to the bore, and exits one body end, with the particulate matter being retained on the filtration material outside of the filtration device.

2. The reusable filtration device as described in claim 1, wherein the reusable filtration material is a polypropylene mesh.

3. The reusable filtration device as described in claim 2, wherein the reusable filtration material has a pore size between approximately 30 microns and approximately 60 microns.

4. The reusable filtration device as described in claim 3, wherein the reusable filtration material is attached to the body by attachment means at each body end.

5. The reusable filtration device as described in claim 4, further comprising an O-ring seal attached to an attachment means.

6. The reusable filtration device as described in claim 5, wherein a second attachment means comprises an end cap having annular side, a bottom and a nipple, the nipple attached to the bottom.

7. The reusable filtration device as described in claim 3, wherein said reusable filtration material is fastened to itself around the body by a longitudinal seam.

8. The reusable filtration device as described in claim 2, wherein the support structure is the body wall.

9. The reusable filtration device as described in claim 8, wherein the support structure is centrally located on the body wall.

10. The reusable filtration device as described in claim 9, wherein the openings are arranged symmetrically within the body.

11. The reusable filtration device as described in claim 10, wherein the length of the body is greater than the diameter of the body.

12. The reusable filtration device as described in claim 11, wherein the reusable filtration material is cylindrical in shape.

13. The reusable filtration device as described in claim 1, wherein the reusable filtration device is manufactured from a plastic material that is resistant to alkalis and acids characteristic of photographic processing chemicals.

14. The reusable filtration device as described in claim 1, wherein one of said end caps includes a vertical annular surface, a beveled annular surface extending therefrom, and an outlet opening.

15. A filtration device for removing particulate matter from a liquid in a liquids processing system, the filtration device comprising:
   a. a tubular body comprising:
      1) a body wall comprising a rigid support structure, the support structure being centrally located in the body wall, the body wall further comprising an inside surface and an outside surface;
      2) a bore within the body, the bore being coextensive with the body wall;
      3) the body wall terminating in a pair of ends, the ends being open;
      4) the body wall having a plurality of inlet openings extending from the outside surface to the inside surface;
   b. filtering means surrounding the body wall outside surface, the filtering means comprising a layer of filtration material and being attached to each body end by an end cap; and
   c. each end cap further comprising positioning means for positioning the filtration device within a receptacle in the liquids processing system, in a manner permitting the liquid to flow from outside the filtering device through the filtering means while leaving the particulate matter on or within the filtering means, enter the inlet openings, enter the bore, and exit the bore through one or more body ends;
      wherein one of said end caps includes a vertical annular surface, a beveled annular surface extending therefrom, and an outlet opening; and
      wherein the filtration device is easily removable from the liquids processing system and the filtration device is washable and reusable after removal.

* * * * *